US011455788B2

(12) United States Patent
Liu et al.

(10) Patent No.: US 11,455,788 B2
(45) Date of Patent: Sep. 27, 2022

(54) METHOD AND APPARATUS FOR POSITIONING DESCRIPTION STATEMENT IN IMAGE, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Xihui Liu, Beijing (CN); Jing Shao, Beijing (CN); Zihao Wang, Beijing (CN); Hongsheng Li, Beijing (CN); Xiaogang Wang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 315 days.

(21) Appl. No.: 16/828,226

(22) Filed: Mar. 24, 2020

(65) Prior Publication Data
US 2020/0226410 A1 Jul. 16, 2020

Related U.S. Application Data

(63) Continuation of application No. PCT/CN2019/086274, filed on May 9, 2019.

(30) Foreign Application Priority Data

Nov. 30, 2018 (CN) .......................... 201811459428.7

(51) Int. Cl.
G06V 10/00 (2022.01)
G06V 10/44 (2022.01)
(Continued)

(52) U.S. Cl.
CPC ........ G06V 10/443 (2022.01); G06F 16/5846 (2019.01); G06F 16/5854 (2019.01); G06N 3/08 (2013.01); G06V 30/153 (2022.01)

(58) Field of Classification Search
CPC .. G06V 10/443; G06V 30/153; G06V 10/454; G06V 20/30; G06V 20/70;
(Continued)

(56) References Cited

U.S. PATENT DOCUMENTS 9,477,908 B2 10/2016 Sigal et al.
10,242,289 B2 3/2019 Cricri
(Continued)

FOREIGN PATENT DOCUMENTS

CN 103106239 A 5/2013
CN 108108771 A 6/2018
(Continued)

OTHER PUBLICATIONS

Yu etal, MAttNet: Modular Attention Network for Referring Expression Comprehension, arXiv:1801.08186v3 Mar. 27, 2018.*
(Continued)

Primary Examiner — Nancy Bitar
Assistant Examiner — Xiao Liu
(74) Attorney, Agent, or Firm — Cooper Legal Group, LLC

(57) ABSTRACT

A method and apparatus for positioning a description statement in an image includes: analyzing a to-be-analyzed description statement and a to-be-analyzed image to obtain a plurality of statement attention weights of the to-be-analyzed description statement and a plurality of image attention weights of the to-be-analyzed image; obtaining a plurality of first matching scores based on the plurality of statement attention weights and a subject feature, a location feature and a relationship feature of the to-be-analyzed image; obtaining a second matching score between the to-be-analyzed description statement and the to-be-analyzed image based on the plurality of first matching scores and the plurality of image attention weights; and determining a
(Continued)

positioning result of the to-be-analyzed description statement in the to-be-analyzed image based on the second matching score.

20 Claims, 7 Drawing Sheets

(51) Int. Cl.
 *G06F 16/583* (2019.01)
 *G06N 3/08* (2006.01)
 *G06V 30/148* (2022.01)

(58) Field of Classification Search
 CPC . G06V 10/40; G06F 16/5846; G06F 16/5854; G06F 40/289; G06F 40/30; G06N 3/08; G06N 3/0445; G06N 3/0454; G06N 3/049; G06K 9/6262
 See application file for complete search history.

(56) References Cited

U.S. PATENT DOCUMENTS

| | | | |
|---|---|---|---|
| 10,643,112 B1* | 5/2020 | Mu | G06V 40/168 |
| 2003/0004893 A1 | 1/2003 | Blaesche | |
| 2003/0048932 A1 | 3/2003 | Zaleski | |
| 2011/0008287 A1 | 1/2011 | Van Der Burg | |
| 2017/0177972 A1 | 6/2017 | Cricri | |
| 2019/0108411 A1* | 4/2019 | Liu | G06V 10/82 |

FOREIGN PATENT DOCUMENTS

| | | |
|---|---|---|
| CN | 108171254 A | 6/2018 |
| CN | 108228686 A | 6/2018 |
| CN | 108229272 A | 6/2018 |
| CN | 108229518 A | 6/2018 |
| CN | 108549850 A | 9/2018 |
| CN | 108694398 A | 10/2018 |
| CN | 108764083 A | 11/2018 |
| CN | 108874360 A | 11/2018 |
| CN | 109614613 A | 4/2019 |
| JP | 2017091525 A | 5/2017 |
| TW | 201222278 A | 6/2012 |
| TW | 201303794 A | 1/2013 |
| TW | 201512863 A | 4/2015 |
| WO | 2008017430 A1 | 2/2008 |
| WO | 2018120550 A1 | 7/2018 |

OTHER PUBLICATIONS

International Search Report in the international application No. PCT/CN2019/086274, dated Sep. 5, 2019, 2 pgs.
First Office Action of the Chinese application No. 201811459428.7, dated Dec. 25, 2019, 10 pgs.
"Improving Referring Expression Grounding with Cross-modal Attention-guided Erasing", Apr. 2, 2019, Xihui Liu, Zihao Wang, Jing Shao, Xiaogang Wang and Hongsheng Li; https://arxiv.org/abs/1903.00839, 10 pgs.
First Office Action of the Japanese application No. 2020-517564, dated Apr. 20, 2021, 6 pgs.
English translation of the Written Opinion of the International Search Authority in the international application No. PCT/CN2019/086274, dated Sep. 5, 2019, 5 pgs.

* cited by examiner

METHOD AND APPARATUS FOR POSITIONING DESCRIPTION STATEMENT IN IMAGE, ELECTRONIC DEVICE, AND STORAGE MEDIUM

CROSS-REFERENCE TO RELATED APPLICATIONS

The present application is a continuation of International Application No. PCT/CN2019/086274, filed on May 9, 2019, which claims priority to Chinese Patent Application No. 201811459428.7, filed on Nov. 30, 2018. The disclosures of International Application No. PCT/CN2019/086274 and Chinese Patent Application No. 201811459428.7 are hereby incorporated by reference in their entireties.

BACKGROUND

Referential phrase positioning is an important issue in the cross fields of computer vision and natural language processing. For example, a machine may be required to position, in an image based on a given sentence (statement), an object (a person, an article, or the like) described by the statement. In the related art, a combined modular network consisting of a positioning module, a relationship module and so on is proposed to identify objects and relationships thereof. However, it is possible that these models excessively reply on specific words or visual concepts and are biased towards frequently observed evidence, resulting in a poor correspondence between a statement and an image.

SUMMARY

The present disclosure relates to the field of computer vision technologies but is not limited to the field of visual technologies, and in particular, to a method and apparatus for positioning a description statement in an image, an electronic device, and a storage medium.

The present disclosure provides technical solutions for positioning a description statement in an image.

A method for positioning a description statement in an image provided according to one aspect of the present disclosure includes: performing analysis processing on a to-be-analyzed description statement and a to-be-analyzed image to obtain a plurality of statement attention weights of the to-be-analyzed description statement and a plurality of image attention weights of the to-be-analyzed image; obtaining a plurality of first matching scores based on the plurality of statement attention weights and a subject feature, a location feature and a relationship feature of the to-be-analyzed image, where the to-be-analyzed image includes a plurality of objects, a subject object is an object with a highest attention weight in the plurality of objects, the subject feature is a feature of the subject object, the location feature is a location feature of the plurality of objects, and the relationship feature is a relationship feature between the plurality of objects; obtaining a second matching score between the to-be-analyzed description statement and the to-be-analyzed image based on the plurality of first matching scores and the plurality of image attention weights; and determining a positioning result of the to-be-analyzed description statement in the to-be-analyzed image based on the second matching score.

An apparatus for positioning a description statement in an image provided according to one aspect of the present disclosure includes: a memory storing processor-executable instructions; and a processor arranged to execute the stored processor-executable instructions to perform operations of: performing analysis processing on a to-be-analyzed description statement and a to-be-analyzed image to obtain a plurality of statement attention weights of the to-be-analyzed description statement and a plurality of image attention weights of the to-be-analyzed image; obtaining a plurality of first matching scores based on the plurality of statement attention weights and a subject feature, a location feature and a relationship feature of the to-be-analyzed image, wherein the to-be-analyzed image comprises a plurality of objects, a subject object is an object with a highest attention weight in the plurality of objects, the subject feature is a feature of the subject object, the location feature is a location feature of the plurality of objects, and the relationship feature is a relationship feature between the plurality of objects; obtaining a second matching score between the to-be-analyzed description statement and the to-be-analyzed image based on the plurality of first matching scores and the plurality of image attention weights; and determining a positioning result of the to-be-analyzed description statement in the to-be-analyzed image based on the second matching score.

An apparatus for positioning a description statement in an image provided according to one aspect of the present disclosure includes: a first weight acquisition module, configured to perform analysis processing on a to-be-analyzed description statement and a to-be-analyzed image to obtain a plurality of statement attention weights of the to-be-analyzed description statement and a plurality of image attention weights of the to-be-analyzed image; a first score acquisition module, configured to obtain a plurality of first matching scores based on the plurality of statement attention weights and a subject feature, a location feature and a relationship feature of the to-be-analyzed image, where the to-be-analyzed image includes a plurality of objects, a subject object is an object with a highest attention weight in the plurality of objects, the subject feature is a feature of the subject object, the location feature is a location feature of the plurality of objects, and the relationship feature is a relationship feature between the plurality of objects; a second score acquisition module, configured to obtain a second matching score between the to-be-analyzed description statement and the to-be-analyzed image based on the plurality of first matching scores and the plurality of image attention weights; and a result determination module, configured to determine a positioning result of the to-be-analyzed description statement in the to-be-analyzed image based on the second matching score.

An electronic device provided according to one aspect of the present disclosure includes: a processor; and a memory configured to store processor executable instructions, where the processor is configured to perform the foregoing method.

A non-transitory computer readable storage medium provided according to one aspect of the present disclosure has computer program instructions stored thereon, and the foregoing method is implemented when the computer program instructions are executed by a processor.

It should be understood that the foregoing general description and the following detailed description are merely exemplary and explanatory, instead of limiting the present disclosure. Other features and aspects of the present disclosure are explicit according to detailed description of exemplary embodiments below with reference to the accompanying drawings.

BRIEF DESCRIPTION OF DRAWINGS

The accompanying drawings here incorporated in the specification and constituting a part of the specification illustrate the embodiments consistent with the present disclosure, and are intended to explain the technical solutions of the present disclosure together with the specification.

DETAILED DESCRIPTION

Figure 1:
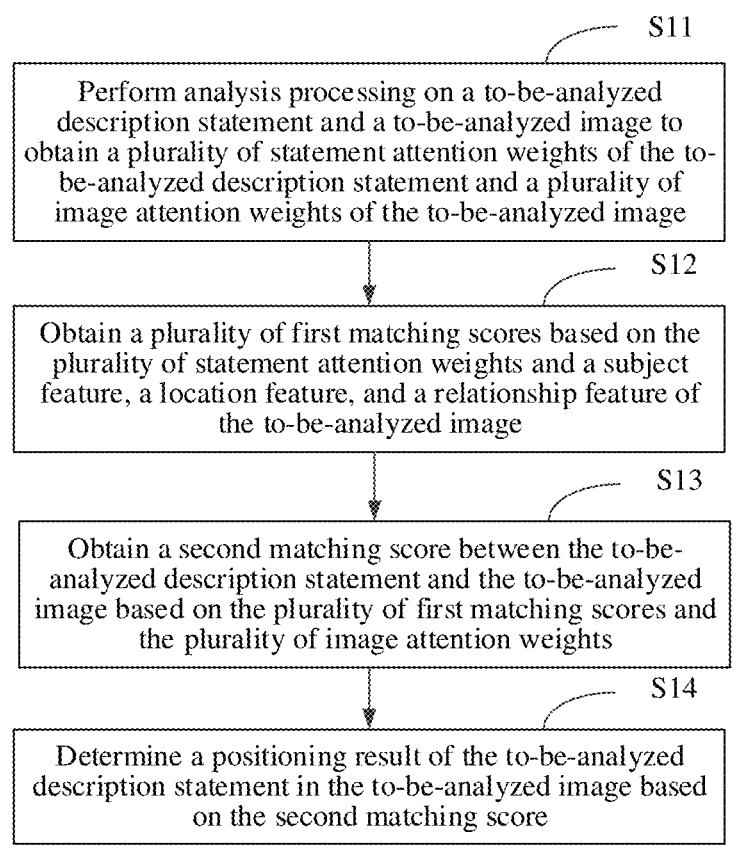
FIG. 1 is a flowchart of a method for positioning a description statement in an image according to embodiments of the present disclosure.

Various exemplary embodiments, features, and aspects of the present disclosure are described below in detail with reference to the accompanying drawings. The same reference numerals in the accompanying drawings represent elements with the same or similar functions. Although various aspects of the embodiments are illustrated in the accompanying drawing, unless stated particularly, it is not required to draw the accompanying drawings in proportion.

The special word "exemplary" here means "used as examples, embodiments, or descriptions". Any "exemplary" embodiment described here is not necessarily construed as being superior to or better than other embodiments.

The term "and/or" herein merely describes an association relationship between associated objects, indicating that there may be three relationships, for example, A and/or B, which may indicate that A exists separately, both A and B exist, and B exists separately. In addition, the term "at least one" herein means any one of a plurality of elements or any combination of at least two of a plurality of elements, for example, including at least one of A, B, and C, which indicates that any one or more elements selected from a set consisting of A, B, and C are included.

In addition, numerous details are given in the following detailed description for the purpose of better explaining the embodiments of the present disclosure. A person skilled in the art should understand that the present disclosure may also be implemented without some specific details. In some examples, methods, means, elements, and circuits well known to a person skilled in the art are not described in detail so as to highlight the subject matter of the present disclosure.

In some embodiments of the present disclosure, the method for positioning a description statement in an image may be performed by an electronic device such as a terminal device or a server. The terminal device may be User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor invoking computer readable instructions stored in a memory. Alternatively, the method may be performed by the server.

FIG. 1 is a flowchart of a method for positioning a description statement in an image according to embodiments of the present disclosure. The method includes the following operations.

At operation S11, analysis processing is performed on a to-be-analyzed description statement and a to-be-analyzed image to obtain a plurality of statement attention weights of the to-be-analyzed description statement and a plurality of image attention weights of the to-be-analyzed image.

In one embodiment, the to-be-analyzed image may include a plurality of objects (persons, animals, articles, and the like), for example, a plurality of persons riding horses. The to-be-analyzed description statement may be a description of a certain object in the to-be-analyzed image, for example, "a brown horse ridden by a girl in the middle". The to-be-analyzed image may correspond to or may not correspond to the to-be-analyzed description statement. An association between a statement and an image may be determined according to the method in the embodiments of the present disclosure.

In one embodiment, the plurality of statement attention weights of the to-be-analyzed description statement may include a statement subject weight, a statement location weight, and a statement relationship weight that are respectively used to indicate attention weights corresponding to different types of words of the to-be-analyzed description statement.

In one embodiment, the plurality of image attention weights of the to-be-analyzed image may include a subject object weight, an object location weight, and an object relationship weight that are respectively used to indicate attention weights corresponding to different types of image regions of the to-be-analyzed image.

At operation S12, a plurality of first matching scores is obtained based on the plurality of statement attention weights and a subject feature, a location feature, and a relationship feature of the to-be-analyzed image, where the to-be-analyzed image includes a plurality of objects, a subject object is an object with a highest attention weight in the plurality of objects, the subject feature is a feature of the subject object, the location feature is a location feature of the plurality of objects, and the relationship feature is a relationship feature between the plurality of objects.

In one embodiment, the to-be-analyzed image includes a plurality of objects (persons, animals, articles, and the like), and a subject object is an object with a highest attention weight in the plurality of objects. The subject feature is an image feature of the subject object, the location feature is a location feature that represents a relative location between the plurality of objects, and the relationship feature is a relationship feature that represents a relative relationship between the plurality of objects.

In one embodiment, the plurality of first matching scores may include a subject matching score, a location matching score, and a relationship matching score. The subject matching score is used to evaluate the matching degree between the subject object in the to-be-analyzed image and an object description of the to-be-analyzed description statement. The location matching score is used to evaluate the matching degree between the relative location of the plurality of objects in the to-be-analyzed image and a location description of the to-be-analyzed description statement. The relationship matching score is used to evaluate the matching degree between an association of the plurality of objects in the to-be-analyzed image and an association description of the to-be-analyzed description statement.

At operation S13, a second matching score between the to-be-analyzed description statement and the to-be-analyzed image is obtained based on the plurality of first matching scores and the plurality of image attention weights.

In one embodiment, the second matching score between the to-be-analyzed description statement and the to-be-analyzed image may be obtained based on the subject matching score, the location matching score, the relationship matching score, the subject object weight, the object location weight and the object relationship weight. The second matching score is used to evaluate an overall matching degree between the to-be-analyzed image and the to-be-analyzed description statement.

At operation S14, a positioning result of the to-be-analyzed description statement in the to-be-analyzed image is determined based on the second matching score.

In one embodiment, after the second matching score is obtained, a positioning location of the to-be-analyzed description statement in the to-be-analyzed image may be further determined, thereby implementing positioning of a description statement in an image.

According to the embodiments of the present disclosure, the statement attention weight of the to-be-analyzed description statement and the image attention weight of the to-be-analyzed image may be obtained; the plurality of first matching scores is obtained based on the statement attention weight and the subject feature, the location feature, and the relationship feature of the image; the second matching score is obtained based on the first matching score and the image attention weight; and the positioning result is determined based on the second matching score. In this way, a correspondence between a text and visual semantics is fully discovered, and the accuracy of positioning a description statement in an image is improved.

In one embodiment, at operation S11, analysis processing may be performed on the to-be-analyzed description statement and the to-be-analyzed image to obtain the plurality of statement attention weights of the to-be-analyzed description statement and the plurality of image attention weights of the to-be-analyzed image. Operation S11 may include:

performing feature extraction on the to-be-analyzed image to obtain an image feature vector of the to-be-analyzed image;

performing feature extraction on the to-be-analyzed description statement to obtain word embedding vectors of a plurality of words of the to-be-analyzed description statement; and obtaining the plurality of statement attention weights of the to-be-analyzed description statement and the plurality of image attention weights of the to-be-analyzed image based on the image feature vector and the word embedding vectors of the plurality of words.

For example, feature extraction may be separately performed on the to-be-analyzed image and the to-be-analyzed description statement. For the to-be-analyzed image, feature extraction may be performed on all pixel points of the to-be-analyzed image to obtain the image feature vector e0 of the to-be-analyzed image. The manner of performing feature extraction on the to-be-analyzed image is not limited in the present disclosure.

In one embodiment, for the to-be-analyzed description statement, word processing may be performed on the to-be-analyzed description statement to determine the plurality of words of the to-be-analyzed description statement, and feature extraction is performed on each word to obtain word embedding vectors $\{e_t\}_{t=1}^{T}$ of the plurality of words, where T represents a quantity of words (T is an integer greater than 1), $e_t$ represents the $t^{th}$ word embedding vector, and $1 \leq t \leq T$. A specific manner of performing word processing on the to-be-analyzed description statement and a specific manner of performing feature extraction on each word are not limited in the present disclosure.

In one embodiment, the plurality of statement attention weights of the to-be-analyzed description statement and the plurality of image attention weights of the to-be-analyzed image may be determined based on the determined image feature vector and the word embedding vectors of the plurality of words.

In one embodiment, the method may further include: obtaining the plurality of statement attention weights of the to-be-analyzed description statement and the plurality of image attention weights of the to-be-analyzed image by using a neural network. The neural network may include a language attention network, which may be implemented by means of a network such as a Recurrent Neural Network (RNN) or a Long Short-Term Memory (LSTM) network. The to-be-analyzed image and the to-be-analyzed description statement may be input into the language attention network for processing to obtain the plurality of statement attention weights and the plurality of image attention weights.

In one embodiment, the to-be-analyzed image and the to-be-analyzed description statement may be input into the language attention network for processing to obtain the plurality of statement attention weights and the plurality of image attention weights.

For example, feature extraction may be performed by using a feature extraction subnetwork of the language attention network to separately obtain the image feature vector e0 and the word embedding vectors $\{e_t\}_{t=1}^{T}$. The feature extraction subnetwork may be a Convolutional Neural Network (CNN) (for example, a faster CNN).

In one embodiment, the language attention network may include an LSTM network based on an attention mechanism. The image feature vector e0 may be used as a first-level input of the LSTM network, and the word embedding vectors $\{e_t\}_{t=1}^{T}$ are used as inputs to all levels of loops of the LSTM network, to obtain output states $h_t$ of a plurality of hidden layers of the LSTM network.

In one embodiment, the image attention weights and an attention weight of each word may be calculated based on a plurality of states $h_t$, and weighted summation is performed on the plurality of word embedding vectors $\{e_t\}_{t=1}^{T}$ based on attention weights of the plurality of words, to obtain the statement attention weights.

In one embodiment, the plurality of statement attention weights of the to-be-analyzed description statement is word-level attention weights, and may include a statement subject weight $q^{subj}$, a statement location weight $q^{loc}$, and a statement relationship weight $q^{rel}$ that are respectively used to indicate attention weights corresponding to different types of words of the to-be-analyzed description statement.

The statement subject weight is used to indicate an attention weight obtained when attention is paid to a subject word in a statement, for example, an attention weight of the subject word "brown horse" or "horse" in the statement "a brown horse ridden by a girl in the middle". The statement location weight is used to indicate an attention weight obtained when attention is paid to a word indicating a location in a statement, for example, an attention weight of the word "in the middle" indicating a location in the foregoing statement. The statement relationship weight is used to indicate an attention weight obtained when attention is paid to a word indicating a relationship between objects in a statement, for example, an attention weight of the word "ridden by a girl" indicating a relationship between objects in the foregoing statement.

In one embodiment, the plurality of image attention weights of the to-be-analyzed image is module-level attention weights, and may include a subject object weight $\omega^{subj}$, an object location weight $\omega^{loc}$, and an object relationship weight $\omega^{rel}$ that are respectively used to indicate attention weights corresponding to different types of image regions of the to-be-analyzed image.

The subject object weight may indicate an attention weight obtained when attention is paid to the most important object (a subject object) in a plurality of objects (persons, animals, articles, and the like) in an image, for example, a person in the middle of the image. The object location weight may indicate an attention weight obtained when attention is paid to a relative location of a plurality of objects in an image, for example, a middle location, a left location, and a right location of the image. The object relationship weight may indicate an attention weight obtained when attention is paid to an association between a plurality of objects in an image, for example, people riding horses in the middle, left, and right of the image.

In some embodiments, the image attention weight may be determined based on various image parameters of the object in the image, and the image parameters include but are not limited to a distribution location of the object in the image, an area occupied by the object in the image, and a subject color of the object in the image. For example, an object in the middle of the image may obtain a higher image attention weight relative to an object in the edge of the image based on the distribution location. For another example, an object that occupies a larger area in the image has a higher attention weight relative to an object that occupies a smaller area. For another example, the subject color of the object is a color of a tracked target, and may have a higher image attention weight relative to another color.

In still other embodiments, an image attention object is determined based on object's various presentation states. For example, by analyzing an image frame of a road monitoring video, if a tracked object is a vehicle, an object with a violation of rules and regulations has a higher image attention weight. For example, if the vehicle included in the image has a behavior feature of crossing a solid line, a higher image attention weight may be configured for the object.

Certainly, the foregoing is merely an example for describing the image attention weight. A specific image attention weight may be configured based on an image processing requirement, and is not limited to the foregoing example.

In this way, different types of information in a vision (an image) and a text (a statement) may be captured by using the language attention network, thereby discovering correspondences between an image and a statement in various aspects and improving processing accuracy.

In one embodiment, before operation S12, the method further includes: inputting the to-be-analyzed image into a feature extraction network for processing to obtain the subject feature, the location feature and the relationship feature of the to-be-analyzed image.

For example, the feature extraction network may be one or more preset CNNs (for example, faster R-CNNs), and is used to extract the subject feature, the location feature, and the relationship feature of the to-be-analyzed image. All pixel points of the to-be-analyzed image may be input into the feature extraction network, and a feature map before ROI pooling is used as an overall image feature of the to-be-analyzed image.

In one embodiment, for the subject feature, the plurality of objects in the to-be-analyzed image may be identified, the object with a highest attention weight in a plurality of regions is extracted as the subject object, and a feature map of a region of the subject object is determined as the subject feature. For example, a feature map of 7×7 is extracted as the subject feature.

In one embodiment, for the location feature, the location feature may be obtained based on a relative location offset and a relative region between image regions in which the plurality of objects in the to-be-analyzed image is located, and a location and a relative region of an object itself.

In one embodiment, for the relationship feature, a relationship feature between context objects (a plurality of objects) may be determined based on a visual feature of average pooling in a region proposal, a relative location offset, and a connection between relative regions.

It should be understood that a specific manner of extracting the subject feature, the location feature, and the relationship feature of the to-be-analyzed image is not limited in the present disclosure.

In one embodiment, at operation S12, the plurality of first matching scores may be obtained based on the plurality of statement attention weights and the subject feature, the location feature, and the relationship feature of the to-be-analyzed image.

For example, the plurality of first matching scores may be obtained by using a neural network. The neural network may include an image attention network, and the image attention network includes a subject network, a location network, and a relationship network. The subject network, the location network, and the relationship network may be separately prebuilt CNNs.

The subject network is used to evaluate the matching degree between the most important object (the subject object) in the plurality of objects (persons, animals, articles, and the like) in the to-be-analyzed image and the object description of the to-be-analyzed description statement. The location network is used to evaluate the matching degree between the relative location of the plurality of objects in the to-be-analyzed image and the location description of the to-be-analyzed description statement. The relationship network is used to evaluate the matching degree between the association of the plurality of objects in the to-be-analyzed image and the association description of the to-be-analyzed description statement.

In one embodiment, the plurality of statement attention weights and the subject feature, the location feature, and the relationship feature of the to-be-analyzed image may be separately input into the subject network, the location network, and the relationship network for processing, to evaluate the matching degree between an image and a statement in various aspects.

The subject object is the object with a highest attention weight in the plurality of objects of the to-be-analyzed image, the subject feature is a feature of the subject object, the location feature is a location feature of the plurality of objects, and the relationship feature is a relationship feature between the plurality of objects.

In one embodiment, the plurality of first matching scores obtained in operation S12 may include a subject matching score, a location matching score, and a relationship matching score.

In one embodiment, operation S12 may include: inputting the statement subject weight and the subject feature into the subject network for processing to obtain the subject matching score; inputting the statement location weight and the location feature into the location network for processing to obtain the location matching score; and inputting the statement relationship weight and the relationship feature into the relationship network for processing to obtain the relationship matching score.

In the embodiments, the statement subject weight and the subject feature are input into the subject network, and the matching degree between a subject of the to-be-analyzed description statement and the subject object of the to-be-analyzed image may be analyzed to obtain the subject matching score. The statement location weight and the location feature are input into the location network, and the matching degree between a location word of the to-be-analyzed description statement and the relative location of the plurality of objects of the to-be-analyzed image may be analyzed to obtain the location matching score. The statement relationship weight and the relationship feature are input into the relationship network, and the matching degree between a relationship word of the to-be-analyzed description statement and the association of the plurality of objects of the to-be-analyzed image may be analyzed to obtain the relationship matching score.

For example, the plurality of statement attention weights (the statement subject weight $q^{subj}$, the statement location weight $q^{loc}$, and the statement relationship weight $q^{rel}$) and the plurality of object features (the subject feature, the location feature, and the relationship feature) may be respectively input into the subject network, the location network, and the relationship network for processing.

In this manner, the matching degree between an image and a description statement in various aspects may be determined, and the accuracy of matching determining is improved.

In one embodiment, at operation S13, the second matching score between the to-be-analyzed description statement and the to-be-analyzed image may be obtained based on the plurality of first matching scores and the plurality of image attention weights. That is, the second matching score between the to-be-analyzed description statement and the to-be-analyzed image is obtained based on the subject matching score, the location matching score, the relationship matching score, the subject object weight $\omega^{subj}$, the object location weight $\omega^{loc}$, and the object relationship weight $\omega^{rel}$.

Operation S13 may include:
performing weighted averaging on the subject matching score, the location matching score and the relationship matching score based on the subject object weight, the object location weight and the object relationship weight to determine the second matching score.

For example, after the subject matching score, the location matching score and the relationship matching score are obtained, the subject matching score, the location matching score and the relationship matching score may be respectively weighted based on the subject object weight $\omega^{subj}$, the object location weight $\omega^{loc}$, and the object relationship weight $\omega^{rel}$, and weighted scores obtained are summed and then averaged. The average value may be determined as the second matching score between the to-be-analyzed description statement and the to-be-analyzed image.

In this manner, an accurate matching score between the to-be-analyzed description statement and the to-be-analyzed image may be obtained.

In one embodiment, at operation S14, the positioning result of the to-be-analyzed description statement in the to-be-analyzed image may be determined based on the second matching score. That is, after the second matching score is obtained, the positioning result of the to-be-analyzed description statement in the to-be-analyzed image may be further determined. Operation S14 may include:
responsive to that the second matching score is greater than or equal to a preset threshold, determining an image region of the subject object as a positioning location of the to-be-analyzed description statement.

For example, a matching score threshold may be preset (for example, the preset threshold is 70). If the second matching score is greater than or equal to the preset threshold, it may be considered that the to-be-analyzed description statement is a description of the subject object in the to-be-analyzed image, and the image region in which the subject object is located may be determined as the positioning location of the to-be-analyzed description statement. On the contrary, if the second matching score is less than the preset threshold, it may be considered that the to-be-analyzed description statement is not the description of the subject object in the to-be-analyzed image, and the positioning result may be determined as not corresponding. It should be understood that a person skilled in the art may set the preset threshold based on an actual situation, and a specific value of the preset threshold is not limited in the present disclosure.

In one embodiment, a plurality of subject objects may be separately set in the to-be-analyzed image, a subject feature of each subject object is input into the image attention network for processing to determine a second matching score of each subject object, and the highest score of a plurality of second matching scores may be determined. In this case, it may be considered that the to-be-analyzed description statement is a description of a subject object corresponding to the highest score, and an image region in which the subject object is located may be determined as the positioning location of the to-be-analyzed description statement.

In this manner, accurate positioning of the to-be-analyzed description statement in the to-be-analyzed image may be implemented.

Figure 2:
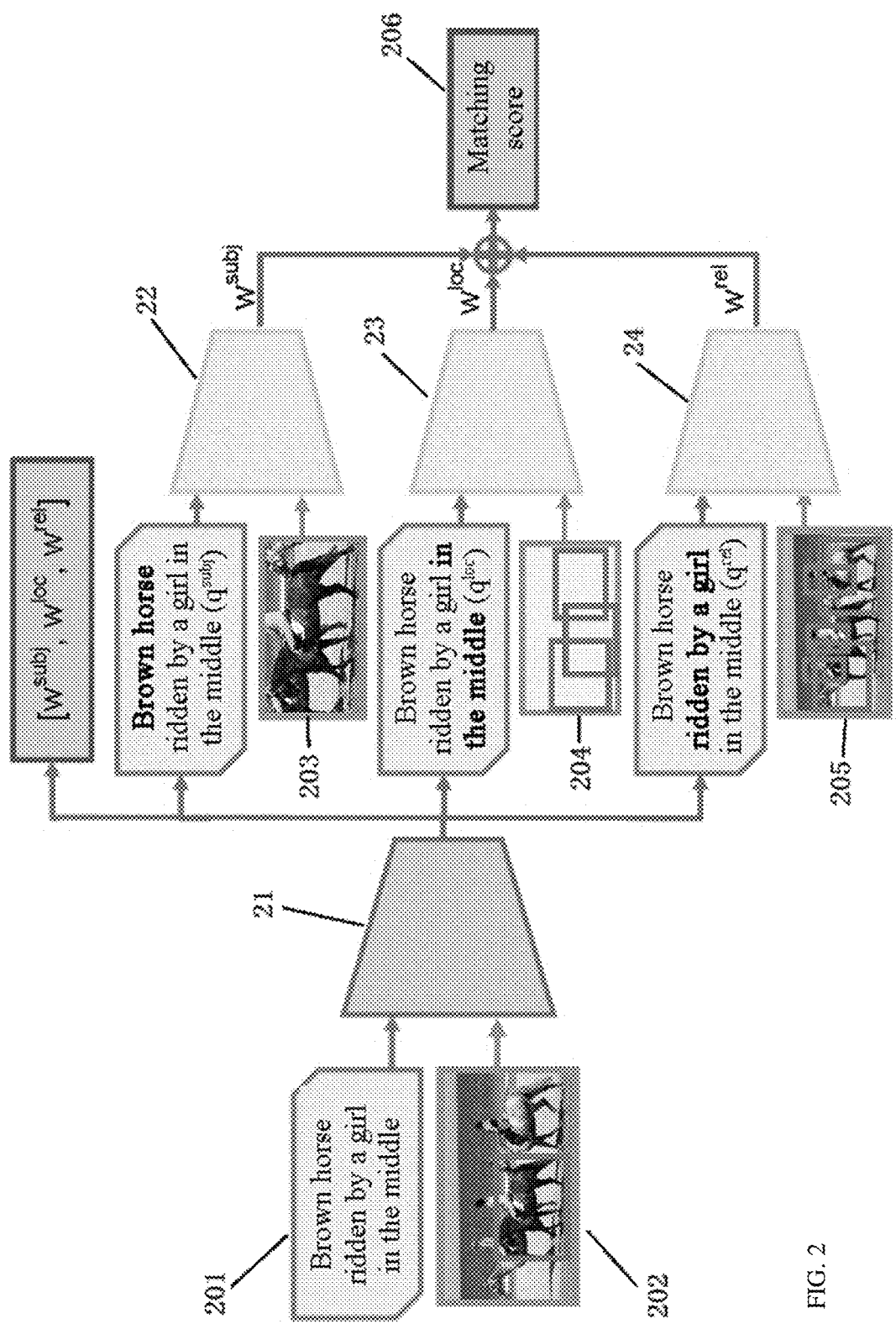
FIG. 2 is a schematic diagram of a neural network according to embodiments of the present disclosure.

FIG. 2 is a schematic diagram of a neural network according to embodiments of the present disclosure. As shown in FIG. 2, the neural network may include a language attention network 21 and an image attention network. The image attention network includes a subject network 22, a location network 23, and a relationship network 24.

In this example, a to-be-analyzed description statement "a brown horse ridden by a girl in the middle" 201 and a to-be-analyzed image 202 are input into the language attention network 21 for processing, so that three image attention weights (a subject object weight $\omega^{subj}$, an object location weight $\omega^{loc}$, and an object relationship weight $\omega^{rel}$) may be output, and three statement attention weights (a statement subject weight $q^{subj}$, a statement location weight $q^{loc}$, and a statement relationship weight $q^{rel}$) are output.

In this example, a subject feature 203, a location feature 204, and a relationship feature 205 of the to-be-analyzed image may be obtained by using a feature extraction network (not shown).

In this example, the statement subject weight $q^{subj}$ and the subject feature 203 are input into the subject network 22 for processing to obtain a subject matching score. The statement location weight $q^{loc}$ and the location feature 204 are input into the location network 23 for processing to obtain a location matching score. The statement relationship weight $q^{rel}$ and the relationship feature 205 are input into the relationship network 24 for processing to obtain a relationship matching score.

In this example, the subject matching score, the location matching score and the relationship matching score are respectively weighted based on the subject object weight $\omega^{subj}$, the object location weight $\omega^{loc}$, and the object relationship weight $\omega^{rel}$, and weighted scores are summed and then averaged to obtain a second matching score 206, so that a positioning result of the to-be-analyzed description statement in the to-be-analyzed image is determined based on the second matching score 206, thereby completing an entire implementation process of operations S11 to S14.

It should be understood that the foregoing is only one example of the neural network that implements the method in the present disclosure, and a specific type of the neural network is not limited in the present disclosure.

In one embodiment, before operation S11, the method further includes: training the neural network by using a sample set, where the sample set includes a plurality of positive sample pairs and a plurality of negative sample pairs.

Each positive sample pair includes a first sample image and a first sample description statement thereof.

Each negative sample pair includes a first sample image and a second sample description statement obtained after a word is removed from the first sample description statement, or a first sample description statement and a second sample image obtained after a region is removed from the first sample image.

In one embodiment, visual or text information with a high attention weight may be removed in a cross-modal removal manner based on attention guidance, to obtain a training sample (a second sample description statement and a second sample image) after the removal, thereby improving training accuracy.

For example, a sample set including a plurality of training samples may be preset, to train the neural network. The sample set includes a plurality of positive sample pairs, and each positive sample pair includes a first sample image O and a first sample description statement Q thereof. A statement describing an object in the first sample image may be used as a first sample description statement in a same positive sample pair. The sample set may further include a plurality of negative sample pairs, and each negative sample pair includes a first sample image and a second sample description statement obtained after a word is removed from the first sample description statement, or a first sample description statement and a second sample image obtained after a region is removed from the first sample image. A specific manner of establishing the sample set is not limited in the present disclosure, and a sequence between a sample image and a sample description statement in each sample pair is not limited in the present disclosure.

In one embodiment, the method may further include:

inputting the first sample description statement and the first sample image in the positive sample pair into the language attention network to obtain attention weights of a plurality of words of the first sample description statement;

replacing a word with a highest attention weight in the first sample description statement with a predetermined identifier to obtain the second sample description statement; and using the first sample image and the second sample description statement as the negative sample pair.

In one embodiment, spatial attention guidance may be performed by using the language attention network, and the most important text information is removed to obtain a relatively difficult text training sample, so that the neural network is prevented from excessively relying on specific text information (word), and the accuracy of the trained neural network is improved.

Figure 3:
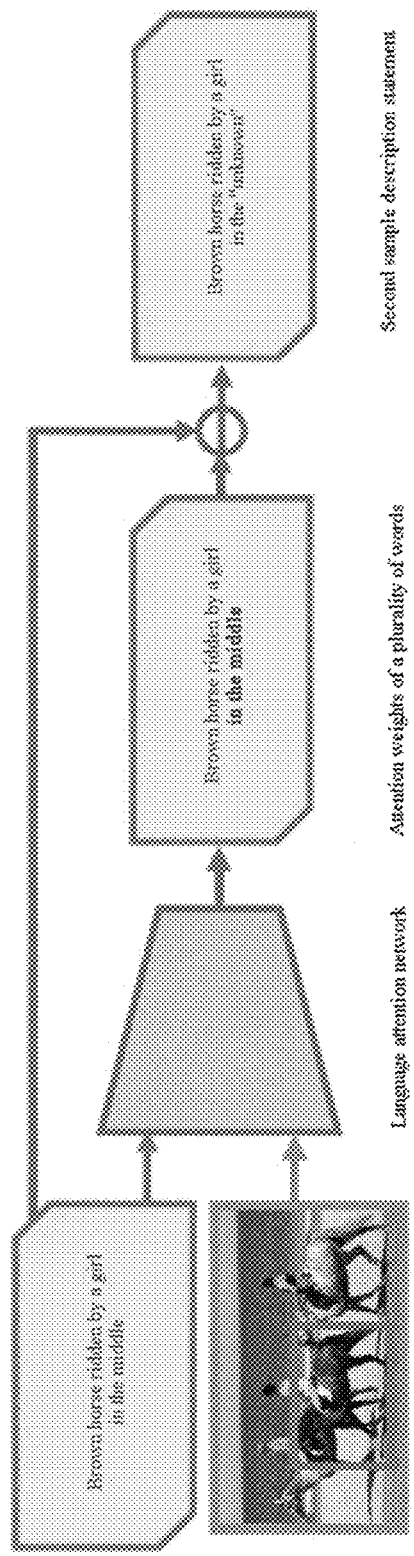
FIG. 3 is a schematic diagram of obtaining a second sample description statement according to embodiments of the present disclosure.

FIG. 3 is a schematic diagram of obtaining a second sample description statement according to embodiments of the present disclosure. For example, as shown in FIG. 3, a first sample description statement (for example, "a brown horse ridden by a girl in the middle") and a first sample image (for example, a picture including a plurality of persons riding horses) in a positive sample pair may be input into a language attention network to obtain attention weights of a plurality of words of the first sample description statement. A word with a highest attention weight (for example, "in the middle") may be determined based on an attention weight of each word. Since directly removing the word "in the middle" may cause a syntax mistake, and the word cannot be identified, an unknown identifier may be used to replace the word "in the middle" to obtain a second sample description statement Q* (a brown horse ridden by a girl in the "unknown"), so that the first sample image and the second sample description statement may be used as a negative sample pair.

In one embodiment, the method may further include:

inputting the first sample description statement and the first sample image in the positive sample pair into the image attention network to obtain an attention weight of the first sample image;

removing an image region with a highest attention weight from the first sample image to obtain the second sample image; and using the second sample image and the first sample description statement as the negative sample pair.

In one embodiment, the most important visual information may be identified and removed by using the image attention network to obtain a relatively difficult image training sample, so that the neural network is prevented from excessively relying on specific visual information, and the accuracy of the trained neural network is improved.

Figure 4:
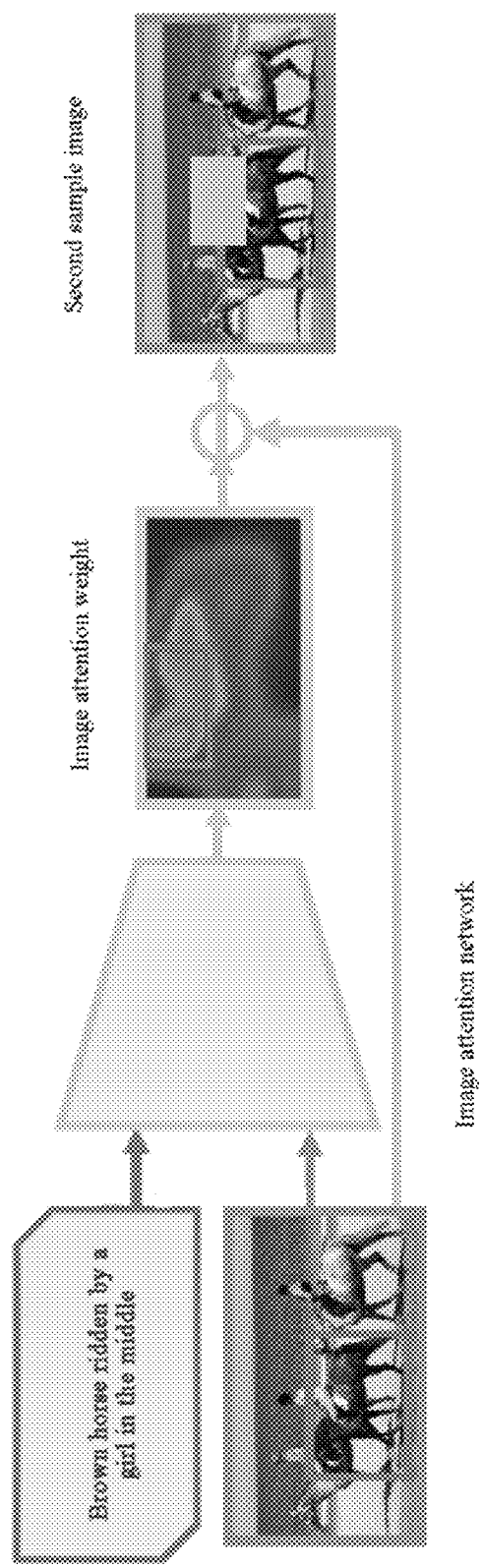
FIG. 4 is a schematic diagram of obtaining a second sample image according to embodiments of the present disclosure.

FIG. 4 is a schematic diagram of obtaining a second sample image according to embodiments of the present disclosure. For example, as shown in FIG. 4, a first sample image (for example, including a plurality of persons riding horses) and a first sample description statement (for example, "a brown horse ridden by a girl in the middle") in a positive sample pair may be input into an image attention network for processing. A subject network of the image attention network may be used, or a location network or a relationship network may be used, which is not limited in the present disclosure.

In one embodiment, the first sample image and the first sample description statement are input into the subject network to obtain an attention weight of each region of the first sample image. A target region with a highest attention weight (for example, an image region in which the girl in the middle is located) may be determined based on the attention weight of each region. The target region is removed from the first sample image to obtain a second sample image O* (as shown in FIG. 4), so that the second sample image and the first sample description statement may be used as a negative sample pair.

In one embodiment, the operation of training the neural network by using a sample set may include: determining an overall loss of the neural network based on a first loss and a second loss of the neural network.

In one embodiment, a network loss of the positive sample pair (the first sample image and the first sample description statement thereof) may be obtained and used as the first loss, and a network loss of the negative sample pair after the removal (the second sample image and the first sample description statement, or the first sample image and a second sample description statement) is obtained.

In one embodiment, the operation of training the neural network by using a sample set may further include: training the neural network based on the overall loss.

In one embodiment, after the overall network loss L is obtained, the neural network may be trained based on the overall network loss L. Therefore, the trained neural network is determined. A specific manner of training the neural network is not limited in the present disclosure.

In one embodiment, before the determining an overall loss of the neural network based on a first loss and a second loss of the neural network, the method further includes: obtaining the first loss.

The operation of obtaining the first loss includes:

inputting a first sample image and a first sample description statement in a same positive sample pair into the neural network for processing to obtain a first training score; inputting a first sample image and a first sample description statement in different positive sample pairs into the neural network for processing to obtain a second training score; and obtaining the first loss based on a plurality of first training scores and a plurality of second training scores.

For example, the network loss of the positive sample pair (the first sample image and the first sample description statement thereof) may be obtained. For any positive sample pair in a training set, a first sample image $O_i$ and a first sample description statement $Q_i$ in a same positive sample pair $(O_i, Q_i)$ may be input into the neural network in FIG. 2 for processing to obtain a first training score s $(O_i, Q_i)$, where i is a sample number, $1 \leq i \leq N$, and N is a quantity of positive sample pairs in the sample set.

In one embodiment, a first sample image and a first sample description statement $(O_i, Q_j)$ that does not correspond to the first sample image in different positive sample pairs may be input into the neural network in FIG. 2 for processing to obtain a second training score s $(O_i, Q_j)$, where j is a sample number, $1 \leq j \leq N$, and j is not equal to i. Similarly, a first sample image and a first sample description statement $(O_j, Qi)$ in different positive sample pairs are input into the neural network to obtain another second training score s $(O_j, Q_i)$.

In one embodiment, positive sample pairs (the first sample images and the first sample description statements) in a training set are respectively processed to obtain a plurality of first training scores and a plurality of second training scores, so as to obtain a first loss $L_{rank}$ of original samples.

$$L_{rank} = \sum_{i,j}^{N} ([m - s(O_i, Q_i) + s(O_i, Q_j)]_+ + [m - s(O_i, Q_i) + s(O_j, Q_i)]_+) \quad (1)$$

In Formula (1), an operator $[x]+$ may represent a maximum value between x and 0, that is, x is taken when x is greater than 0, and 0 is taken when x is less than or equal to 0; and m may be a constant and is used to indicate a spacing between network losses. It should be understood that a person skilled in the art may set a value of m (for example, 0.1) based on an actual situation, and a specific value of m is not limited in the present disclosure.

In one embodiment, before the determining an overall loss of the neural network based on a first loss and a second loss of the neural network, the method further includes: obtaining the second loss.

The operation of obtaining the second loss includes:

inputting a second sample image and a first sample description statement in a same negative sample pair into the neural network for processing to obtain a third training score; inputting a second sample image and a first sample description statement in different negative sample pairs into the neural network for processing to obtain a fourth training score; inputting a first sample image and a second sample description statement in a same negative sample pair into the neural network for processing to obtain a fifth training score; inputting a first sample image and a second sample description statement in different negative sample pairs into the neural network for processing to obtain a sixth training score; and obtaining the second loss based on a plurality of third training scores, a plurality of fourth training scores, a plurality of fifth training scores and a plurality of sixth training scores.

For example, the network loss of the negative sample after the removal (the second sample image and the second sample description statement) may be obtained. For a same negative sample pair $(O^*_i, Q_i)$ in a training set, a second sample image $O^*_i$ and a first sample description statement $Q_i$ may be input into the neural network in FIG. 2 for processing to obtain a third training score $s(O^*_i, Q_1)$, where i is a sample number, $1 \leq i \leq N$, and N is a quantity of sample pairs in the sample set.

In one embodiment, for different negative sample pairs (a second sample image $O^*_1$ and a first sample description statement $Q_j$ that is not corresponding to the second sample image $O^*_i$) in a training set, the second sample image $O^*_i$ and the first sample description statement $Q_j$ may be input into the neural network in FIG. 2 for processing to obtain a fourth training score $s(O^*_i, Q_j)$, where j is a sample number, $1 \leq j \leq N$, and j is not equal to i.

Similarly, a first sample image and a corresponding second sample description statement in a same negative sample pair $(O_i, Q^*_i)$ are input into the neural network to obtain a fifth training score $s(O_i, Q^*_i)$. A first sample image and a second sample description statement in different negative sample pairs $(O_j, Q^*_i)$ are input into the neural network to obtain a sixth training score $s(O_j, Q^*_i)$.

In one embodiment, a plurality of positive sample pairs (the first sample images and the first sample description statements) in a training set and negative sample pairs after removal are respectively processed to obtain a plurality of third training scores, a plurality of fourth training scores, a plurality of fifth training scores and a plurality of sixth training scores, so as to obtain a second loss $L_{erase}$ of samples after the removal.

$$L_{erase} = \sum_{i,j}^{N} ([m - s(O^*_i, Q_i) + s(O^*_i, Q_j)]_+ + [m - s(O_i, Q^*_i) + s(O_j, Q^*_i)]_+) \quad (2)$$

In Formula (2), an operator $[x]_+$ may represent a maximum value between x and 0, that is, x is taken when x is greater than 0, and 0 is taken when x is less than or equal to 0; and m may be a constant, and is used to indicate a spacing between network losses. It should be understood that a person skilled in the art may set a value of m (for example, 0.1) based on an actual situation, and a specific value of m is not limited in the present disclosure.

In one embodiment, after the first loss and the second loss are determined, the overall loss of the neural network may be determined based on the first loss and the second loss, and the neural network is further trained based on the overall loss.

The operation of determining an overall loss of the neural network based on a first loss and a second loss of the neural network includes: performing weighted superposition on the first loss and the second loss to obtain the overall loss of the neural network.

For example, the overall network loss L of the neural network may be calculated by using the following formula:

$$L=\beta L_{erase}+\gamma L_{rank} \qquad (3)$$

In Formula (3), $\beta$ and $\gamma$ respectively represent weights of the first loss and the second loss. It should be understood that a person skilled in the art may set values of $\beta$ and $\gamma$ based on an actual situation, and specific values of $\beta$ and $\gamma$ are not limited in the present disclosure.

In one embodiment, after the overall network loss L is obtained, the neural network may be trained based on the overall network loss L. For example, a network parameter value of the neural network may be adjusted based on the overall network loss L by using a reverse gradient method, and the overall network loss L is obtained again. After adjustment is performed for a plurality of times, when a preset training condition is met (the network loss L is converged or the number of trainings is reached), the trained neural network may be determined. A specific manner of training the neural network is not limited in the present disclosure.

According to the method for positioning a description statement in an image in the embodiments of the present disclosure, the most important visual or text information with a high attention weight is eliminated in a cross-mode erase manner to generate a difficult training sample, so as to drive a neural network model to find additional evidence other than the most significant evidence. According to the embodiments of the present disclosure, a relatively difficult training sample is formed by using an erased image of an original query statement or an erased query statement of an original image, so that the neural network model better uses training data to learn a potential text-picture correspondence without increasing inference complexity.

According to the embodiments of the present disclosure, the method may be applied to a terminal such as a robot or a mobile phone, and a location of a figure in an image is positioned according to a person's instruction (text or voice), to implement an accurate correspondence between a text and an image.

A person skilled in the art may understand that, in the foregoing method of specific implementations, the writing sequence of the operations does not mean a strict execution sequence and is not intended to constitute any limitation on an implementation process. A specific execution sequence of the operations should be determined according to functions and possible internal logic of the operations.

It may be understood that the foregoing method embodiments mentioned in the present disclosure may be combined with each other to form a combined embodiment without departing from the principle and the logic. Details are not described in the present disclosure due to space limitation.

Figure 5:
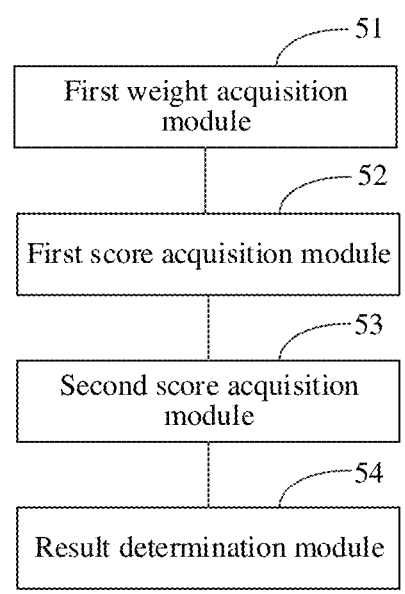
FIG. 5 is a block diagram of an apparatus for positioning a description statement in an image according to embodiments of the present disclosure.

FIG. 5 is a block diagram of an apparatus for positioning a description statement in an image according to embodiments of the present disclosure. As shown in FIG. 5, the apparatus for positioning a description statement in an image includes:

a first weight acquisition module 51, configured to perform analysis processing on a to-be-analyzed description statement and a to-be-analyzed image to obtain a plurality of statement attention weights of the to-be-analyzed description statement and a plurality of image attention weights of the to-be-analyzed image;

a first score acquisition module 52, configured to obtain a plurality of first matching scores based on the plurality of statement attention weights and a subject feature, a location feature, and a relationship feature of the to-be-analyzed image, where the to-be-analyzed image includes a plurality of objects, a subject object is an object with a highest attention weight in the plurality of objects, the subject feature is a feature of the subject object, the location feature is a location feature of the plurality of objects, and the relationship feature is a relationship feature between the plurality of objects;

a second score acquisition module 53, configured to obtain a second matching score between the to-be-analyzed description statement and the to-be-analyzed image based on the plurality of first matching scores and the plurality of image attention weights; and a result determination module 54, configured to determine a positioning result of the to-be-analyzed description statement in the to-be-analyzed image based on the second matching score.

In one embodiment, the first weight acquisition module includes:

an image feature extraction submodule, configured to perform feature extraction on the to-be-analyzed image to obtain an image feature vector of the to-be-analyzed image;

a word feature extraction submodule, configured to perform feature extraction on the to-be-analyzed description statement to obtain word embedding vectors of a plurality of words of the to-be-analyzed description statement; and a first weight acquisition submodule, configured to obtain the plurality of statement attention weights of the to-be-analyzed description statement and the plurality of image attention weights of the to-be-analyzed image based on the image feature vector and the word embedding vectors of the plurality of words.

In one embodiment, the apparatus further includes: a second weight acquisition module, configured to obtain the plurality of statement attention weights of the to-be-analyzed description statement and the plurality of image attention weights of the to-be-analyzed image by using a neural network.

In one embodiment, the plurality of statement attention weights includes a statement subject weight, a statement location weight, and a statement relationship weight. The neural network includes an image attention network. The image attention network includes a subject network, a location network, and a relationship network. The plurality of first matching scores includes a subject matching score, a location matching score, and a relationship matching score. The first score acquisition module includes:

a first score acquisition submodule, configured to input the statement subject weight and the subject feature into the subject network for processing to obtain the subject matching score;

a second score acquisition submodule, configured to input the statement location weight and the location feature into the location network for processing to obtain the location matching score; and a third score acquisition submodule, configured to input the statement relationship weight and the relationship feature into the relationship network for processing to obtain the relationship matching score.

In one embodiment, the plurality of image attention weights includes a subject object weight, an object location weight, and an object relationship weight. The second score acquisition module includes:

a fourth score acquisition submodule, configured to perform weighted averaging on the subject matching score, the location matching score and the relationship matching score based on the subject object weight, the object location weight and the object relationship weight to determine the second matching score.

In one embodiment, the apparatus further includes:

a third weight acquisition module, configured to input the to-be-analyzed image into a feature extraction feature for processing to obtain the subject feature, the location feature, and the relationship feature.

In one embodiment, the result determination module includes:

a location determination submodule, configured to: responsive to that the second matching score is greater than or equal to a preset threshold, determine an image region of the subject object as a positioning location of the to-be-analyzed description statement.

In one embodiment, before the second weight acquisition module, the apparatus further includes: a training module, configured to train the neural network by using a sample set, where the sample set includes a plurality of positive sample pairs and a plurality of negative sample pairs.

Each positive sample pair includes a first sample image and a first sample description statement of the first sample image.

Each negative sample pair includes a first sample image and a second sample description statement obtained after a word is removed from the first sample description statement, or a first sample description statement and a second sample image obtained after a region is removed from the first sample image.

In one embodiment, the neural network further includes a language attention network, and the apparatus further includes:

a word weight determination module, configured to input the first sample description statement and the first sample image in the positive sample pair into the language attention network to obtain attention weights of a plurality of words of the first sample description statement;

a word replacement module, configured to replace a word with a highest attention weight in the first sample description statement with a predetermined identifier to obtain the second sample description statement; and a first negative sample pair determination module, configured to use the first sample image and the second sample description statement as the negative sample pair.

In one embodiment, the apparatus further includes:

an image weight determination module, configured to input the first sample description statement and the first sample image in the positive sample pair into the image attention network to obtain an attention weight of the first sample image;

a region removal module, configured to remove an image region with a highest attention weight from the first sample image to obtain the second sample image; and a second negative sample pair determination module, configured to use the second sample image and the first sample description statement as the negative sample pair.

In one embodiment, the training module includes:

an overall loss determination submodule, configured to determine an overall loss of the neural network based on a first loss and a second loss of the neural network; and a training submodule, configured to train the neural network based on the overall loss.

In one embodiment, the apparatus further includes: a first loss acquisition submodule, configured to obtain the first loss before the overall loss determination submodule. The first loss acquisition submodule is configured to:

input a first sample image and a first sample description statement in a same positive sample pair into the neural network for processing to obtain a first training score;

input a first sample image and a first sample description statement in different positive sample pairs into the neural network for processing to obtain a second training score; and obtain the first loss based on a plurality of first training scores and a plurality of second training scores.

In one embodiment, the apparatus further includes: a second loss acquisition submodule, configured to obtain the second loss before the overall loss determination submodule. The second loss acquisition submodule is configured to:

input a second sample image and a first sample description statement in a same negative sample pair into the neural network for processing to obtain a third training score;

input a second sample image and a first sample description statement in different negative sample pairs into the neural network for processing to obtain a fourth training score;

input a first sample image and a second sample description statement in a same negative sample pair into the neural network for processing to obtain a fifth training score;

input a first sample image and a second sample description statement in different negative sample pairs into the neural network for processing to obtain a sixth training score; and obtain the second loss based on a plurality of third training scores, a plurality of fourth training scores, a plurality of fifth training scores and a plurality of sixth training scores.

In one embodiment, the overall loss determination submodule is configured to:

perform weighted superposition on the first loss and the second loss to obtain the overall loss of the neural network.

In some embodiments, functions or modules included in the apparatus provided in the embodiments of the present disclosure may be configured to perform the method described in the foregoing method embodiments. For specific implementation thereof, refer to the descriptions of the foregoing method embodiments. For brevity, details are not described here again.

The embodiments of the present disclosure further provide a computer readable storage medium having computer program instructions stored thereon, where the foregoing method is implemented when the computer program instructions are executed by a processor. The computer readable storage medium may be a non-volatile computer readable storage medium.

The embodiments of the present disclosure further provide an electronic device, including a processor, and a memory configured to store processor executable instructions, where the processor is configured to perform the foregoing method.

The electronic device may be provided as a terminal, a server, or other forms of devices.

Figure 6:
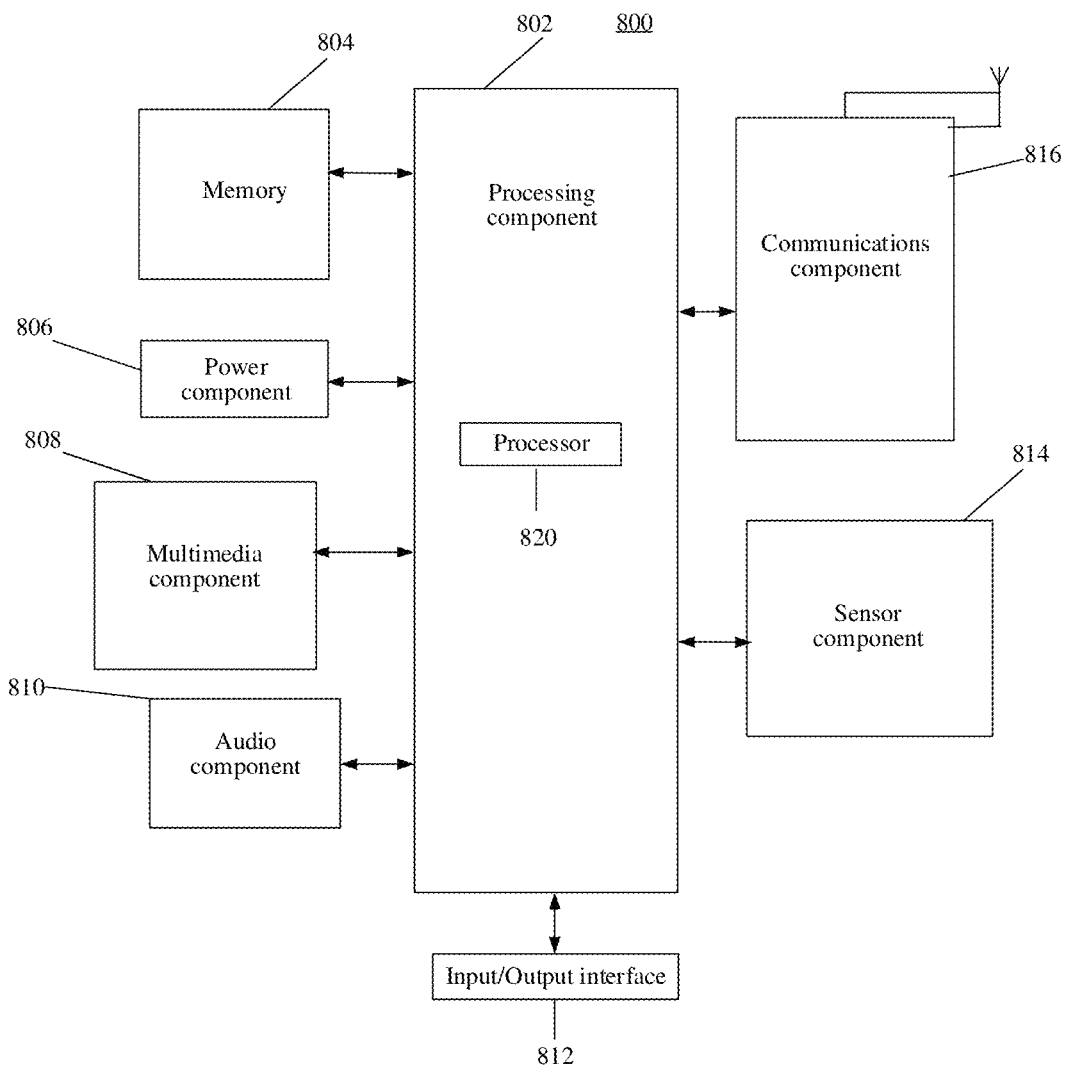
FIG. 6 is a block diagram of an electronic device according to embodiments of the present disclosure.

FIG. 6 is a block diagram of an electronic device 800 according to embodiments of the present disclosure. For example, the electronic device 800 may be a terminal such as a mobile phone, a computer, a digital broadcast terminal, a message transceiver device, a game console, a tablet device, a medical device, a fitness device, a personal digital assistant, or a vehicle-mounted device.

Referring to FIG. 6, the electronic device 800 may include one or more of the following components: a processing component 802, a memory 804, a power component 806, a multimedia component 808, an audio component 810, an Input/Output (I/O) interface 812, a sensor component 814, and a communications component 816.

The processing component 802 generally controls overall operation of the electronic device 800, such as operations associated with display, phone calls, data communications, camera operations, and recording operations. The processing component 802 may include one or more processors 820 to execute instructions to implement all or some of the operations of the foregoing method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any disclosure or method operated on the electronic device 800, contact data, contact list data, messages, pictures, videos, and the like. The memory 804 may be implemented by any type of volatile or non-volatile storage device, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

The power component 806 supplies power to various components of the electronic device 800. The power component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen is implemented as a touchscreen to receive an input signal from the user. The TP includes one or more touch sensors for sensing touches, swipes, and gestures on the TP. The touch sensor may not only sense the boundary of a touch action or a swipe action, but also detect the duration and pressure related to the touch operation or the swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system or has focal length and optical zoom capabilities.

The audio component 810 is configured to output and/or input an audio signal. For example, the audio component 810 includes one microphone (MIC). When the electronic device 800 is in an operation mode, such as a calling mode, a recording mode, or a voice recognition mode, the microphone is configured to receive an external audio signal. The received audio signal is further stored in the memory 804 or sent by means of the communications component 816. In some embodiments, the audio component 810 further includes a loudspeaker for outputting an audio signal.

The I/O interface 812 provides an interface between the processing component 802 and a peripheral interface module, which may be a keyboard, a click wheel, a button, or the like. These buttons may include but are not limited to a home button, a volume button, a startup button, and a lock button.

The sensor component 814 includes one or more sensors, and is configured to provide state assessment in various aspects for the electronic device 800. For example, the sensor component 814 may detect an on/off state of the electronic device 800, and relative positioning of the components, for example, the components are a display and a keypad of the electronic device 800. The sensor component 814 may also detect a location change of the electronic device 800 or a component of the electronic device 800, the presence or absence of contact between the user and the electronic device 800, an orientation or acceleration/deceleration of the electronic device 800, and a temperature change of the electronic device 800. The sensor component 814 may include a proximity sensor, configured to detect the presence of a nearby object when there is no physical contact. The sensor component 814 may further include an optical sensor, such as a CMOS or CCD image sensor, for use in an imaging disclosure. In some embodiments, the sensor component 814 may further include an acceleration sensor, a gyroscope sensor, a magnetic sensor, a pressure sensor, or a temperature sensor.

The communications component 816 is configured to facilitate wired or wireless communication between the electronic device 800 and other devices. The electronic device 800 may access a communication standard-based wireless network, such as WiFi, 2G or 3G, or a combination thereof. In one exemplary embodiment, the communications component 816 receives a broadcast signal or broadcast-related information from an external broadcast management system through a broadcast channel. In one exemplary embodiment, the communications component 816 further includes a Near Field Communication (NFC) module to facilitate short-range communication. For example, the NFC module may be implemented based on a Radio Frequency Identification (RFID) technology, an Infrared Data Association (IrDA) technology, an Ultra Wideband (UWB) technology, a Bluetooth (BT) technology, and other technology.

In an exemplary embodiment, the electronic device 800 may be implemented by one or more of an Disclosure Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to perform the foregoing method.

In an exemplary embodiment, a non-volatile computer readable storage medium, for example, the memory 804 including computer program instructions, is further provided. The computer program instructions may be executed by the processor 820 of the electronic device 800 to complete the foregoing method.

Figure 7:
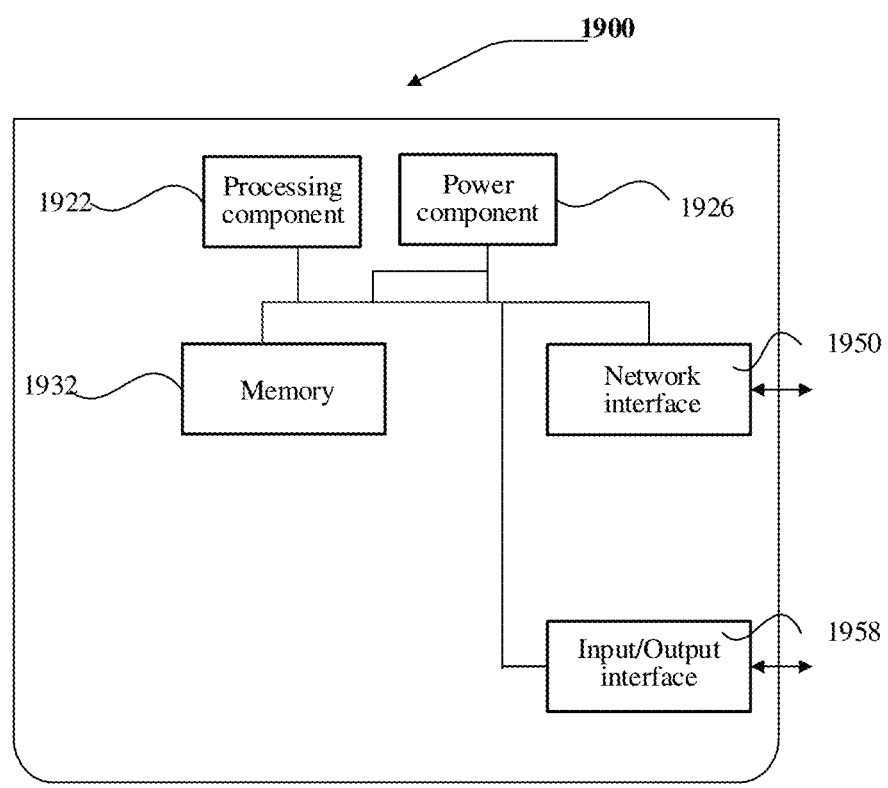
FIG. 7 is a block diagram of an electronic device according to embodiments of the present disclosure.

FIG. 7 is a block diagram of an electronic device 1900 according to embodiments of the present disclosure. For example, the electronic device 1900 may be provided as a server. Referring to FIG. 7, the electronic device 1900 includes a processing component 1922 that further includes one or more processors; and a memory resource represented by a memory 1932, configured to store an instruction, for example, an disclosure program, that may be executed by the processing component 1922. The disclosure program stored in the memory 1932 may include one or more modules that each correspond to a set of instructions. In addition, the processing component 1922 is configured to execute the instructions to perform the following method.

The electronic device 1900 may further include: a power supply component 1926, configured to perform power management of the electronic device 1900; a wired or wireless network interface 1950, configured to connect the electronic device 1900 to a network; and an I/O interface 1958. The electronic device 1900 may operate an operating system stored in the memory 1932, such as Windows Server™, Mac OS X™, Unix™, Linux™, or FreeBSD™.

In an exemplary embodiment, a non-volatile computer readable storage medium, for example, the memory 1932 including computer program instructions, is further provided. The computer program instructions may be executed by the processing component 1922 of the electronic device 1900 to complete the foregoing method.

The present disclosure may be a system, a method, and/or a computer program product. The computer program product may include a computer readable storage medium, on which computer readable program instructions used by the processor to implement various aspects of the present disclosure are stored.

The computer readable storage medium is a tangible device that may maintain and store instructions used by an instruction execution device. For example, the computer readable storage medium may be, but not limited to, an electrical storage device, a magnetic storage device, an optical storage device, an electromagnetic storage device, a semiconductor storage device, or any appropriate combination thereof. More specific examples (a non-exhaustive list) of the computer readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer readable program instructions described here are downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer readable program instructions from the network, and forwards the computer readable program instructions, so that the computer readable program instructions are stored in a computer readable storage medium in each computing/processing device.

Computer program instructions for executing the operations of the present disclosure are compilation instructions, Instruction Set Architecture (ISA) instructions, machine instructions, machine-related instructions, microcode, firmware instructions, status setting data, or source code or target code written in any combination of one or more programming languages, including an object-oriented programming language such as Smalltalk or C++, and a conventional procedural programming language such as the "C" language or a similar programming language. The program readable program instructions may be completely executed on a user computer, partially executed on a user computer, executed as an independent software package, executed partially on a user computer and partially on a remote computer, or completely executed on a remote computer or a server. In a scenario involving a remote computer, the remote computer may be connected to a user computer via any type of network, including a Local Area Network (LAN) or a Wide Area Network (WAN), or may be connected to an external computer (for example, connected via the Internet with the aid of an Internet service provider). In some embodiments, an electronic circuit such as a programmable logic circuit, an FPGA, or a Programmable Logic Array (PLA) is personalized by using status information of the computer readable program instructions, and the electronic circuit may execute the computer readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams may be implemented with the computer readable program instructions.

These computer readable program instructions may be provided for a general-purpose computer, a dedicated computer, or a processor of another programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer readable program instructions may also be stored in a computer readable storage medium, and these instructions instruct a computer, a programmable data processing apparatus, and/or other devices to work in a specific manner. Therefore, the computer readable medium having the instructions stored thereon includes a manufacture, and the manufacture includes instructions for implementing specified functions/actions in one or more blocks in the flowcharts and/or block diagrams.

The computer readable program instructions may also be loaded onto a computer, other programmable data processing apparatuses, or other devices, so that a series of operations and operations are executed on the computer, the other programmable apparatuses, or the other devices, thereby generating computer-implemented processes. Therefore, the instructions executed on the computer, the other programmable apparatuses, or the other devices implement the specified functions/actions in the one or more blocks in the flowcharts and/or block diagrams.

The flowcharts and block diagrams in the accompanying drawings show architectures, functions, and operations that may be implemented by the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms used herein are intended to best explain the principles of the embodiments, practical disclosures, or improvements to the technologies in the market, or to enable other persons of ordinary skill in the art to understand the embodiments disclosed herein.

The invention claimed is:

1. A computer-implemented method for positioning a description statement in an image, comprising:
    performing analysis processing on a to-be-analyzed description statement and a to-be-analyzed image to obtain a plurality of statement attention weights of the to-be-analyzed description statement and a plurality of image attention weights of the to-be-analyzed image;
    obtaining a plurality of first matching scores based on the plurality of statement attention weights and a subject feature, a location feature and a relationship feature of the to-be-analyzed image, wherein the to-be-analyzed image comprises a plurality of objects, a subject object is an object with a highest attention weight in the plurality of objects, the subject feature is a feature of the subject object, the location feature is a location feature of the plurality of objects, and the relationship feature is a relationship feature between the plurality of objects;
    obtaining a second matching score between the to-be-analyzed description statement and the to-be-analyzed image based on the plurality of first matching scores and the plurality of image attention weights; and
    determining a positioning result of the to-be-analyzed description statement in the to-be-analyzed image based on the second matching score,
    wherein the method further comprises: obtaining the plurality of statement attention weights of the to-be-analyzed description statement and the plurality of image attention weights of the to-be-analyzed image by using a neural network,
    wherein the method further comprises: before the obtaining the plurality of statement attention weights of the to-be-analyzed description statement and the plurality of image attention weights of the to-be-analyzed image by using a neural network, training the neural network by using a sample set, wherein the sample set comprises a plurality of positive sample pairs and a plurality of negative sample pairs,
    wherein each positive sample pair comprises a first sample image and a first sample description statement of the first sample image, and
    wherein each negative sample pair comprises the first sample image and a second sample description statement obtained after a word is removed from the first sample description statement, or comprises the first sample description statement and a second sample image obtained after a region with a highest image attention weight is removed from the first sample image.

2. The computer-implemented method according to claim 1, wherein the performing analysis processing on a to-be-analyzed description statement and a to-be-analyzed image to obtain a plurality of statement attention weights of the to-be-analyzed description statement and a plurality of image attention weights of the to-be-analyzed image comprises:
    performing feature extraction on the to-be-analyzed image to obtain an image feature vector of the to-be-analyzed image;
    performing feature extraction on the to-be-analyzed description statement to obtain word embedding vectors of a plurality of words of the to-be-analyzed description statement; and
    obtaining the plurality of statement attention weights of the to-be-analyzed description statement and the plurality of image attention weights of the to-be-analyzed image based on the image feature vector and the word embedding vectors of the plurality of words.

3. The computer-implemented method according to claim 1, wherein the plurality of statement attention weights comprises a statement subject weight, a statement location weight and a statement relationship weight;
    the neural network comprises an image attention network;
    the image attention network comprises a subject network, a location network and a relationship network;
    the plurality of first matching scores comprises a subject matching score, a location matching score and a relationship matching score,
    wherein the obtaining a plurality of first matching scores based on the plurality of statement attention weights and a subject feature, a location feature and a relationship feature of the to-be-analyzed image comprises:
        inputting the statement subject weight and the subject feature into the subject network for processing to obtain the subject matching score;
        inputting the statement location weight and the location feature into the location network for processing to obtain the location matching score; and
        inputting the statement relationship weight and the relationship feature into the relationship network for processing to obtain the relationship matching score.

4. The computer-implemented method according to claim 3, wherein the plurality of image attention weights comprises a subject object weight, an object location weight and an object relationship weight,
    wherein the obtaining a second matching score between the to-be-analyzed description statement and the to-be-analyzed image based on the plurality of first matching scores and the plurality of image attention weights comprises:
        performing weighted averaging on the subject matching score, the location matching score and the relationship matching score based on the subject object weight, the object location weight and the object relationship weight to determine the second matching score.

5. The computer-implemented method according to claim 1, further comprising:
   inputting the to-be-analyzed image into a feature extraction network for processing to obtain the subject feature, the location feature and the relationship feature.

6. The computer-implemented method according to claim 1, wherein the determining a positioning result of the to-be-analyzed description statement in the to-be-analyzed image based on the second matching score comprises:
   responsive to the second matching score being greater than or equal to a preset threshold, determining an image region of the subject object as a positioning location of the to-be-analyzed description statement.

7. The computer-implemented method according to claim 1, wherein the neural network further comprises a language attention network, wherein the method further comprises:
   inputting the first sample description statement and the first sample image in the positive sample pair into the language attention network to obtain attention weights of a plurality of words of the first sample description statement;
   replacing a word with a highest attention weight in the first sample description statement with a predetermined identifier to obtain the second sample description statement; and
   using the first sample image and the second sample description statement as the negative sample pair.

8. The computer-implemented method according to claim 1, wherein the neural network comprises an image attention network, wherein the method comprises:
   inputting the first sample description statement and the first sample image in the positive sample pair into the image attention network to obtain an attention weight of the first sample image;
   removing an image region with a highest attention weight from the first sample image to obtain the second sample image; and
   using the second sample image and the first sample description statement as the negative sample pair.

9. The computer-implemented method according to claim 1, wherein the training the neural network by using a sample set comprises:
   determining an overall loss of the neural network based on a first loss and a second loss of the neural network; and
   training the neural network based on the overall loss.

10. The computer-implemented method according to claim 9, further comprising: before the determining an overall loss of the neural network based on a first loss and a second loss of the neural network, obtaining the first loss,
   wherein the operation of obtaining the first loss comprises:
      inputting a first sample image and a first sample description statement in a same positive sample pair into the neural network for processing to obtain a first training score;
      inputting a first sample image and a first sample description statement in different positive sample pairs into the neural network for processing to obtain a second training score; and
      obtaining the first loss based on a plurality of first training scores and a plurality of second training scores.

11. The computer-implemented method according to claim 9, further comprising: before the determining an overall loss of the neural network based on a first loss and a second loss of the neural network, obtaining the second loss,
   wherein the step of obtaining the second loss comprises:
      inputting a second sample image and a first sample description statement in a same negative sample pair into the neural network for processing to obtain a third training score;
      inputting a second sample image and a first sample description statement in different negative sample pairs into the neural network for processing to obtain a fourth training score;
      inputting a first sample image and a second sample description statement in a same negative sample pair into the neural network for processing to obtain a fifth training score;
      inputting a first sample image and a second sample description statement in different negative sample pairs into the neural network for processing to obtain a sixth training score; and
      obtaining the second loss based on a plurality of third training scores, a plurality of fourth training scores, a plurality of fifth training scores and a plurality of sixth training scores.

12. The computer-implemented method according to claim 9, wherein the determining an overall loss of the neural network based on a first loss and a second loss of the neural network comprises:
   performing weighted superposition on the first loss and the second loss to obtain the overall loss of the neural network.

13. An apparatus for positioning a description statement in an image, comprising:
   a memory storing processor-executable instructions; and
   a processor arranged to execute the stored processor-executable instructions to perform operations of:
   performing analysis processing on a to-be-analyzed description statement and a to-be-analyzed image to obtain a plurality of statement attention weights of the to-be-analyzed description statement and a plurality of image attention weights of the to-be-analyzed image;
   obtaining a plurality of first matching scores based on the plurality of statement attention weights and a subject feature, a location feature and a relationship feature of the to-be-analyzed image, wherein the to-be-analyzed image comprises a plurality of objects, a subject object is an object with a highest attention weight in the plurality of objects, the subject feature is a feature of the subject object, the location feature is a location feature of the plurality of objects, and the relationship feature is a relationship feature between the plurality of objects;
   obtaining a second matching score between the to-be-analyzed description statement and the to-be-analyzed image based on the plurality of first matching scores and the plurality of image attention weights; and
   determining a positioning result of the to-be-analyzed description statement in the to-be-analyzed image based on the second matching score,
   wherein the processor is arranged to execute the stored processor-executable instructions to further perform an operation of: obtaining the plurality of statement attention weights of the to-be-analyzed description statement and the plurality of image attention weights of the to-be-analyzed image by using a neural network, wherein the processor is arranged to execute the stored processor-executable instructions to further perform an operation of: before the obtaining the plurality of statement attention weights of the to-be-analyzed description statement and the plurality of image attention weights of the to-be-analyzed image by using a neural network, training the neural network by using a sample set, wherein the sample set comprises a plurality of positive sample pairs and a plurality of negative sample pairs, wherein each positive sample pair comprises a first sample image and a first sample description statement of the first sample image, and wherein each negative sample pair comprises the first sample image and a second sample description statement obtained after a word is removed from the first sample description statement, or comprises the first sample description statement and a second sample image obtained after a region with a highest image attention weight is removed from the first sample image.

14. The apparatus according to claim 13, wherein the performing analysis processing on a to-be-analyzed description statement and a to-be-analyzed image to obtain a plurality of statement attention weights of the to-be-analyzed description statement and a plurality of image attention weights of the to-be-analyzed image comprises:

performing feature extraction on the to-be-analyzed image to obtain an image feature vector of the to-be-analyzed image;

performing feature extraction on the to-be-analyzed description statement to obtain word embedding vectors of a plurality of words of the to-be-analyzed description statement; and obtaining the plurality of statement attention weights of the to-be-analyzed description statement and the plurality of image attention weights of the to-be-analyzed image based on the image feature vector and the word embedding vectors of the plurality of words.

15. The apparatus according to claim 13, wherein the plurality of statement attention weights comprises a statement subject weight, a statement location weight and a statement relationship weight, the neural network comprises an image attention network, the image attention network comprises a subject network, a location network and a relationship network, and the plurality of first matching scores comprises a subject matching score, a location matching score and a relationship matching score, wherein the obtaining a plurality of first matching scores based on the plurality of statement attention weights and a subject feature, a location feature and a relationship feature of the to-be-analyzed image comprises:

inputting the statement subject weight and the subject feature into the subject network for processing to obtain the subject matching score;

inputting the statement location weight and the location feature into the location network for processing to obtain the location matching score; and inputting the statement relationship weight and the relationship feature into the relationship network for processing to obtain the relationship matching score.

16. The apparatus according to claim 15, wherein the plurality of image attention weights comprises a subject object weight, an object location weight and an object relationship weight, wherein the obtaining a second matching score between the to-be-analyzed description statement and the to-be-analyzed image based on the plurality of first matching scores and the plurality of image attention weights comprises:

performing weighted averaging on the subject matching score, the location matching score and the relationship matching score based on the subject object weight, the object location weight and the object relationship weight to determine the second matching score.

17. A non-transitory computer readable storage medium having stored thereon computer program instructions that, when executed by a processor, cause the processor to perform operations of a computer-implemented method for positioning a description statement in an image, the method comprising:

performing analysis processing on a to-be-analyzed description statement and a to-be-analyzed image to obtain a plurality of statement attention weights of the to-be-analyzed description statement and a plurality of image attention weights of the to-be-analyzed image;

obtaining a plurality of first matching scores based on the plurality of statement attention weights and a subject feature, a location feature and a relationship feature of the to-be-analyzed image, wherein the to-be-analyzed image comprises a plurality of objects, a subject object is an object with a highest attention weight in the plurality of objects, the subject feature is a feature of the subject object, the location feature is a location feature of the plurality of objects, and the relationship feature is a relationship feature between the plurality of objects;

obtaining a second matching score between the to-be-analyzed description statement and the to-be-analyzed image based on the plurality of first matching scores and the plurality of image attention weights; and determining a positioning result of the to-be-analyzed description statement in the to-be-analyzed image based on the second matching score, wherein the method further comprises: obtaining the plurality of statement attention weights of the to-be-analyzed description statement and the plurality of image attention weights of the to-be-analyzed image by using a neural network, wherein the method further comprises: before the obtaining the plurality of statement attention weights of the to-be-analyzed description statement and the plurality of image attention weights of the to-be-analyzed image by using a neural network, training the neural network by using a sample set, wherein the sample set comprises a plurality of positive sample pairs and a plurality of negative sample pairs, wherein each positive sample pair comprises a first sample image and a first sample description statement of the first sample image, and wherein each negative sample pair comprises the first sample image and a second sample description statement obtained after a word is removed from the first sample description statement, or comprises the first sample description statement and a second sample image obtained after a region with a highest image attention weight is removed from the first sample image.

18. The non-transitory computer readable storage medium according to claim 17, wherein the performing analysis processing on a to-be-analyzed description statement and a to-be-analyzed image to obtain a plurality of statement attention weights of the to-be-analyzed description statement and a plurality of image attention weights of the to-be-analyzed image comprises:

performing feature extraction on the to-be-analyzed image to obtain an image feature vector of the to-be-analyzed image;

performing feature extraction on the to-be-analyzed description statement to obtain word embedding vectors of a plurality of words of the to-be-analyzed description statement; and obtaining the plurality of statement attention weights of the to-be-analyzed description statement and the plurality of image attention weights of the to-be-analyzed image based on the image feature vector and the word embedding vectors of the plurality of words.

19. The non-transitory computer readable storage medium according to claim 17, wherein the plurality of statement attention weights comprises a statement subject weight, a statement location weight and a statement relationship weight;

the neural network comprises an image attention network;

the image attention network comprises a subject network, a location network and a relationship network;

the plurality of first matching scores comprises a subject matching score, a location matching score and a relationship matching score, wherein the obtaining a plurality of first matching scores based on the plurality of statement attention weights and a subject feature, a location feature and a relationship feature of the to-be-analyzed image comprises:

inputting the statement subject weight and the subject feature into the subject network for processing to obtain the subject matching score;

inputting the statement location weight and the location feature into the location network for processing to obtain the location matching score; and inputting the statement relationship weight and the relationship feature into the relationship network for processing to obtain the relationship matching score.

20. The non-transitory computer readable storage medium according to claim 19, wherein the plurality of image attention weights comprises a subject object weight, an object location weight and an object relationship weight, wherein the obtaining a second matching score between the to-be-analyzed description statement and the to-be-analyzed image based on the plurality of first matching scores and the plurality of image attention weights comprises:

performing weighted averaging on the subject matching score, the location matching score and the relationship matching score based on the subject object weight, the object location weight and the object relationship weight to determine the second matching score.

\* \* \* \* \*